April 16, 1935.  A. D. PENTZ  1,998,094

VEHICLE BRAKE OPERATOR

Filed Jan. 15, 1932

Patented Apr. 16, 1935

1,998,094

UNITED STATES PATENT OFFICE 1,998,094

VEHICLE BRAKE OPERATOR

Albert D. Pentz, New Brighton, N. Y., assignor to Pentz Motor Brake Corporation, New Brighton, N. Y., a corporation of New York Application January 15, 1932, Serial No. 586,858

5 Claims. (Cl. 60—54.6)

This invention pertains to vehicle brakes, particularly hydraulic brakes, and has for its principal object the disclosure of an improved actuating device.

Further and other objects and advantages will be apparent from the specification and claims, and from the accompanying drawing which illustrates what is now considered the preferred embodiment of the invention.

Figure 1:
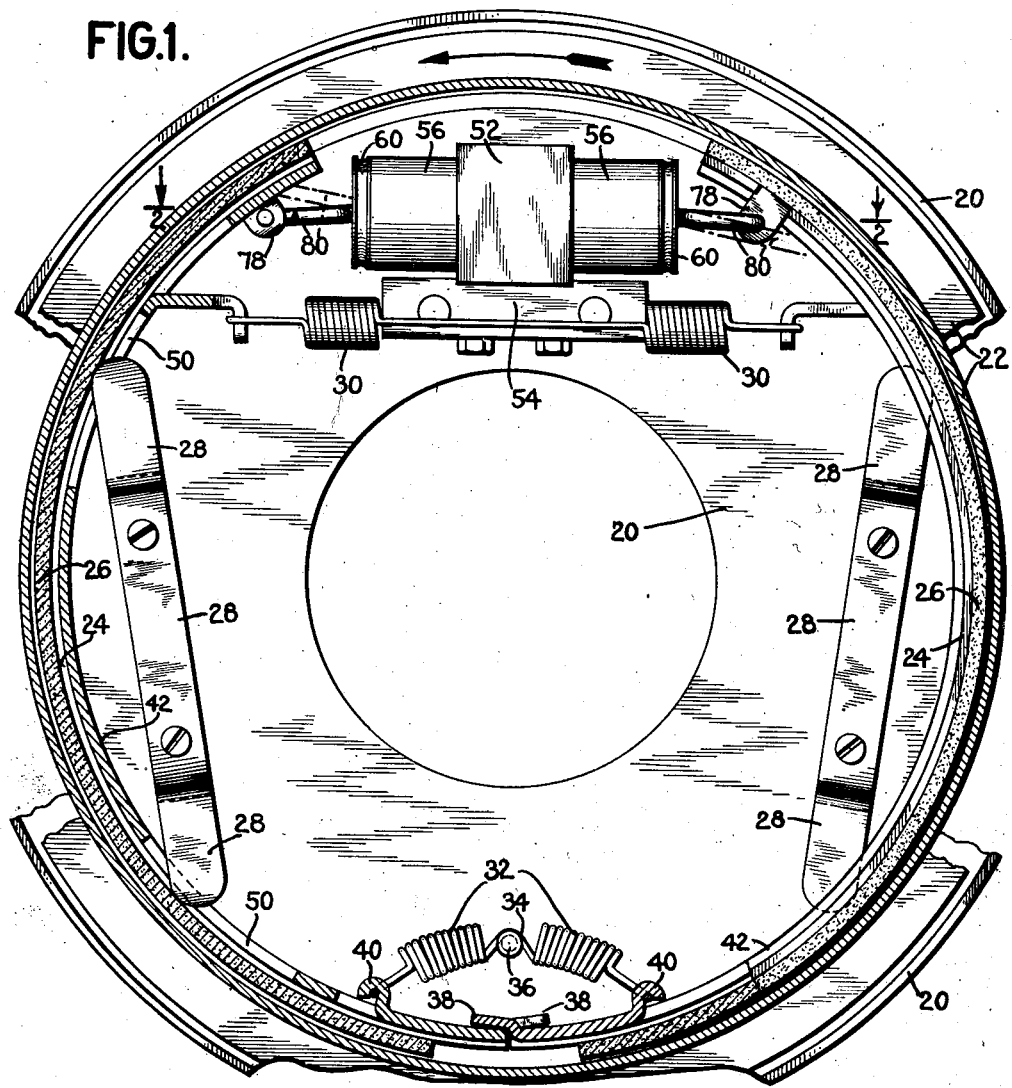
Fig. 1 is a side view of the brake, partly in cross-section and partly broken away.

In the drawing, 20 designates the apron or backing plate attached non-rotatably to the vehicle, while 22 is the brake drum attached to a wheel or other rotating member. Within the drum is a friction member or brake band which may be in the form of a pair of band-like shoes 24 hinged together at the bottom and faced with friction lining 26. The friction member is held in retracted position against stops 28 by retractile springs 30 and 32, attached to suitable ears on the brake bands.

The hinge joint between the two halves of the brake band comprises upwardly bent interlocking fingers 38 formed from the metal of bands 24. The fingers are of such shape and dimensions that the two halves of the friction member are similar and interchangeable.

The device for actuating the brake comprises a hydraulic unit having a body portion 52 secured to apron 20 by means of bracket 54; cylinders 56 secured to body 52; and plungers 58 in the cylinders. Flanges 60 limit the inward travel of the plungers.

Pressure fluid entering the interior of the unit through passage 62 and openings 64 in floating bushing 66 pushes plungers 58 outwardly through the instrumentality of elastic cup-shaped members 68. The hydraulic unit as described above is already known. Member 68 may crack in service, especially at corners adjacent the plungers, and in order to prevent a crack of that kind from disabling the brake I provide an expansible cup 70, preferably of comparatively soft rubber, fitted snugly within each cup 68 which automatically prevents leakage through any crack appearing in a cup 68, thus permitting the brake to continue to function. A compression spring 72, supported by bushing 66 holds cups 70 tightly seated in their respective members 68.

Figure 2:
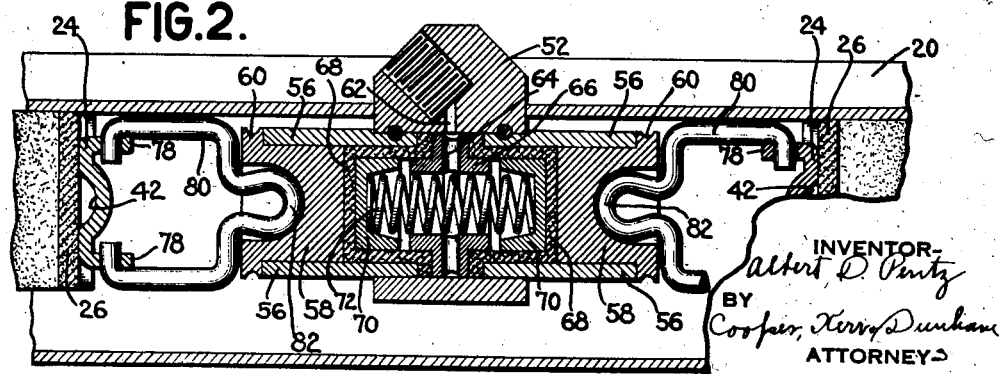
Fig. 2 is a cross-section on line 2—2 of Fig. 1.

Thrust from plungers 58 may be transmitted to the upper ends of the brake band through the links 80 of Figs. 1 and 2 or, thrust members 80 which are in the form of bent wire links having their ends pivotally connected to the brake bands through ears 78, and having their mid portions formed as loops 82 adapted to enter sockets in plungers 58.

It is to be understood that the invention is not limited to the specific embodiment herein illustrated and described, but may be used in other ways without departure from its spirit as defined by the following claims.

I claim:

1. In a fluid pressure brake system, a fluid-tight elastic thrust member and means for securing said member in operative position, in combination with an elastic sealing member in contact with said thrust member and adapted to automatically prevent leakage of fluid through said thrust member in case said thrust member should become cracked in the area covered by said sealing member, said sealing member being free from said securing means.

2. In a fluid pressure brake system, a fluid-tight elastic cup-shaped thrust member, in combination with a sealing member within said thrust member, said sealing member being effective to automatically seal any leaks occurring in said thrust member in the area covered by said sealing member.

3. The invention set forth in claim 2 in which said sealing member is cup-shaped and fits snugly within said thrust member, substantially as described.

4. The invention set forth in claim 1 in which a spring is provided for holding said sealing member in close contact with said thrust member.

5. In a fluid pressure brake system, a pair of oppositely disposed fluid-tight elastic cup-shaped thrust members, and an elastic sealing member in each of said thrust members, in combination with a compression spring between said sealing members for holding said members in close contact with said thrust members.

ALBERT D. PENTZ.

CERTIFICATE OF CORRECTION.

Patent No. 1,998,094.                                April 16, 1935.

ALBERT D. PENTZ.

It is hereby certified that error appears in the printed specification of the above numbered patent requiring correction as follows: Page 1, second column, line 6, strike out the words and comma "the links 80 of Figs. 1 and 2 or,"; and that the said Letters Patent should be read with this correction therein that the same may conform to the record of the case in the Patent Office.

Signed and sealed this 11th day of June, A. D. 1935.

Leslie Frazer (Seal)                                        Acting Commissioner of Patents.